United States Patent [19]

Carbrey et al.

[11] 4,313,225
[45] Jan. 26, 1982

[54] OPTO-ISOLATOR HYBRID CIRCUIT

[75] Inventors: Robert L. Carbrey, Boulder; James E. Dalley, Brighton, both of Colo.

[73] Assignee: Bell Telephone Laboratories, Incorporated, Murray Hill, N.J.

[21] Appl. No.: 91,385

[22] Filed: Nov. 5, 1979

[51] Int. Cl.³ .............................................. H04B 9/00
[52] U.S. Cl. ..................................... 455/602; 250/551
[58] Field of Search ....................... 455/602; 307/311; 250/551

[56] References Cited

U.S. PATENT DOCUMENTS 3,410,961  11/1968  Slana ................................. 307/311
4,056,719  11/1977  Waabon .............................. 455/602
4,087,647   5/1978  Embree et al. ...................... 179/77

OTHER PUBLICATIONS

Judo et al–Bidirectional Optical Isolator–IBM Tech. Discl. Bull.-vol. 22, #4, Sep. 1979, pp. 1671-1672.

Sager–DC Isolation for Bidirectional Signal Transmission Electronik, vol. 24, #12, p. 76, Dec. 1975.

Primary Examiner—Joseph A. Orsino, Jr.
Attorney, Agent, or Firm—J. M. Graziano

[57] ABSTRACT

The disclosed four-wire to two-wire converter employs a pair of dual detector opto-isolator circuits to both linearize the converter transfer characteristic and eliminate signal feedback between ports. This is accomplished by feeding back the signals transmitted by the transmit portion of the four-wire port through the auxiliary detector of the opto-isolator circuit connected across the two-wire port to prevent signal feedback to the receive portion of the four-wire port. This opto-isolator feedback arrangement eliminates the need for complex feedback and impedance matching circuitry thereby enabling direct connection of the opto-isolator circuits to the communication paths while also rendering the converter circuit transparent to signals appearing thereon.

13 Claims, 2 Drawing Figures

4,313,225

OPTO-ISOLATOR HYBRID CIRCUIT

TECHNICAL FIELD

This invention relates to hybrid circuits and in particular to an opto-isolator hybrid which employs a dual detector opto-isolator feedback cancellation arrangement.

BACKGROUND ART

There have been numerous prior art hybrid cicruits employing dual detector linearized opto-isolators. These prior art hybrid circuits include U.S. Pat. No. 4,056,719 issued Nov. 1, 1977 to S. G. Waaben. The Waaben patent teaches an isolation circuit which provides the required separation by converting a two-wire termination to a four-wire circuit and then back again to a second two-wire termination. Each leg of the Waaben four-wire circuit employs one of a pair of dual detector opto-isolator circuits for unidirectional transmission and isolation while a signal cancellation scheme is also provided to prevent feedback. This opto-isolator and signal cancellation combination eliminates the need for line transformers to provide the required isolation.

The Waaben dual detector opto-isolator circuits achieve a linear transmission characteristic by providing feedback through an auxiliary detector to the input of the opto-isolator thereby compensating for the inherent nonlinearity of the opto-isolator device. The Waaben two-wire to two-wire isolation circuit uses one of a pair of these linearized opto-isolator circuits to transmit signals from the tip and ring conductors of the first two-wire circuit through a first "transmit" section to the second two-wire circuit while the other dual detector opto-isolator circuit transmits signals from the second two-wire circuit through a second "transmit" section to the tip and ring conductors of the first two-wire circuit. However, since both transmitted and received signals appear together on the tip and ring conductors of both two-wire circuits, this necessitates the use of signal cancellation impedances and summing amplifiers to prevent the signals transmitted by the first "transmit" portion from being fed back through the two-wire circuit to the associated "receive" portion and vice versa. The problem with the use of a signal cancellation impedance is that it, in turn, necessitates the use of a termination impedance in each two-wire circuit to match the input impedance of the isolation circuit to the impedance of the tip and ring conductors.

DISCLOSURE OF THE INVENTION

The foregoing problem is solved and a technical advance achieved by an arrangement which employs the dual detector opto-isolator circuits themselves as a feedback cancellation arrangement thereby eliminating the need for impedance matching while also providing a linear transmission characteristic.

This is accomplished by the two-wire to four-wire hybrid of the present invention which connects the input of the first of a pair of dual detector opto-isolator circuits across the tip and ring conductors to transmit the signals appearing on the two-wire circuit to the receive section of the four-wire circuit while the second of the pair of dual detector opto-isolator circuits is similarly employed to transmit signals from the transmit section of the four-wire circuit to the tip and ring conductors of the two-wire circuit.

The linear transmission characteristic is achieved by providing a linearizing feedback signal through an auxiliary detector to the opto-isolator input to compensate for the inherent nonlinearity of the opto-isolator device. However, since both transmitted and received signals appear together on the tip and ring conductors of the two-wire circuit, a signal cancellation arrangement is needed to prevent the signal transmitted by the transmit portion of the four-wire circuit from being fed back through the two-wire circuit to the receive portion of the four-wire circuit. This signal cancellation is accomplished by combining the above-mentioned linearizing feedback signal with a portion of the output of the second opto-isolator circuit to generate equal but opposite signals which are both applied to the input of the first opto-isolator circuit. These two signals cancel in the opto-isolator circuit thereby eliminating the signal feedback problem.

Thus, this opto-isolator feedback cancellation arrangement eliminates the need for complex feeback and impedance matching circuits, thereby enabling direct connection of the opto-isolator circuit to the tip and ring conductors while also rendering the hybrid circuit transparent to signals appearing thereon.

DETAILED DESCRIPTON—FIG. 1

Figure 1:
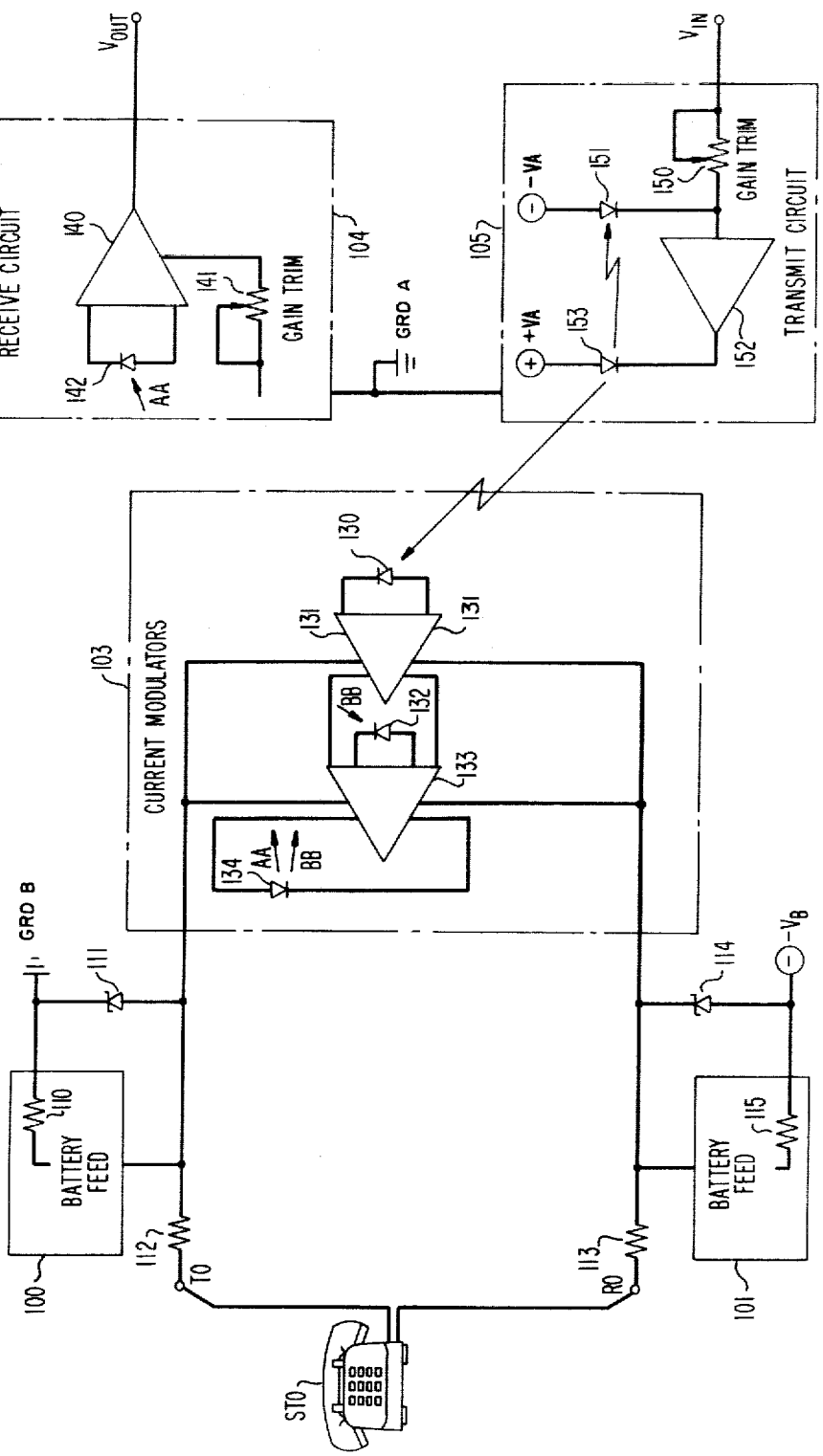
FIG. 1 shows, in block diagram form, the overall system aspects of the disclosed hybrid circuit.

FIG. 1 illustrates, in block diagram form, the hybrid circuit of our invention which employs a dual detector opto-isolator feedback cancellation arrangement. It is assumed that the hybrid circuit shown in FIG. 1 is connected on the two-wire side to a communication pair and telephone station set ST0 via hybrid circuit terminals T0 and R0. The four-wire side of the hybrid circuit is connected through hybrid circuit terminals $V_{OUT}$ and $V_{IN}$ to a four-wire transmission system (not shown).

BATTERY FEED 100, 101

Each of battery feed circuits 100, 101 comes close to the ideal of an open circuit (constant current source) for transverse signals and a short circuit for longitudinal signals. This allows loop current to be provided to telephone station set ST0 and bias current to be provided for current modulators 103 without loading the transverse signal circuit. Additionally, any undesired longitudinal signals appearing on hybrid circuit terminal T0 are terminated by resistor 112 in series with battery feed circuit 100, which combination is connected between hybrid circuit terminal T0 and circuit ground $GRD_B$. Similarly, any undesirable longitudinal signals appearing on hybrid circuit terminal R0 are terminated in a like manner via resistor 113 and battery feed circuit 101 which are connected in series between hybrid circuit terminal R0 and the negative supply voltage $-V_B$.

The resistors in series with hybrid circuit terminals T0 and R0 are designed to burn out (open) if a power cross occurs at either or both of these terminals. Thus, the current from lightning hits will be limited by these resistors (assuming that the voltage is limited by carbon blocks or some other suitable protector). The lightning voltage applied to battery feed circuits 100, 101 and current modulators 103 is limited by breakdown diodes 111, 114 connected to power supply terminal $GND_B$ and $-V_B$ respectively. The light barriers (opto-isolators) between transmit circuit 105, receive circuit 104 and current modulators 103 effectively isolate the remainder of the system from hostile voltages which may appear at hybrid circuit terminals T0, R0. Even if diodes 111, 114 or resistors 112, 113 do not provide the intended protection functions, the opto-isolators will protect personnel and the four-wire transmission system for external voltages up to 2500 volts.

SIGNAL TRANSMISSION

Signals can pass through the circuit in either of two directions. The incoming and outgoing signals can best be understood by assuming that you are using telephone station set ST0 connected to hybrid circuit terminals T0, R0. Incoming signals from the four-wire transmission system originate at hybrid circuit terminal $V_{IN}$ and terminate in telephone station set ST0 which is connected to hybrid circuit terminals T0, R0. When you speak into the transmitter of telephone station set ST0, the signal passes over the communication pair to hybrid circuit terminals T0, R0 where it is processed by the hybrid circuit and then applied to hybrid circuit terminal $V_{OUT}$ which is connected to the four-wire transmission system.

The ratio of the voltage between the hybrid circuit two-wire terminals T0, R0 and the hybrid circuit four-wire terminal $V_{IN}$ is called GAIN1. The ratio of the voltage between the hybrid circuit four-wire terminal $V_{OUT}$ and the hybrid circuit two-wire terminals T0, R0 is called GAIN2. The requirements on the gain contrast are very stringent and the absolute gain in each direction must be controlled to close tolerances. In the present circuit, a resistor 150 in transmit circuit 10, must be trimmed to adjust GAIN1 while resistor 141 in receive circuit 104 is trimmed to adjust GAIN2.

An incoming signal from the four-wire transmission system is applied to terminal $V_{IN}$ and passes through transmit circuit 105 where it modulates the current flowing through light emitting diode 153. The modulated light output from light emitting diode 153 illuminates both light detecting diodes 151 and 130. Light detecting diode 151 is in a feedback path which linearizes the output signal of light emitting diode 153 and stabilizes the circuit against certain variations in the characteristics of light emitting diode 153 as described in the above referenced Waaben patent.

The modulated light falling upon light detecting diode 130 modulates the current flowing through it to reproduce the signal appearing at terminal $V_{IN}$. This modulated current is amplified by current amplifier 131 and, thus, the loop current flowing in the receiver of telephone station set ST0 is also modulated because battery feed circuits 100, 101 supply a constant current which must be divided between current modulators 103 and the telephone station set loop circuit. Therefore, the signal current drawn by current amplifier 131 is reflected through battery feed circuits 100, 101 to telephone station set ST0.

For an outgoing signal, the speaker's voice causes the transmitter of telephone station set ST0 to modulate the loop current. Again, since battery feed circuits 100, 101 supply a constant signal current, the signal current must flow through some path in current modulators 103. The path provided is through light emitting diode 134. The modulated light output of light emitting diode 134 is coupled to light detecting diodes 132, 142. Light detecting diode 132 linearizes and stabilizes the signal coupled to light detecting diode 142 while the modulated current in light detecting diode 142 is converted by amplifier 140 to a voltage which becomes the output signal at the hybrid circuit four-wire terminal $V_{OUT}$.

HYBRID BALANCE

One may logically wonder why the output of current amplifier 131 would not modulate the current through light emitting diode 134. This would cause the incoming signal to be coupled to the hybrid circuit four-wire terminal $V_{OUT}$ as well as to the hybrid circuit two-wire terminals T0, R0. Indeed, the current through light emitting diode 134 is modulated by the incoming signal. However, current amplifiers 131 and 133 are coupled together in such manner that each current amplifier provides an equal and opposite current through light emitting diode 134 when an incoming signal is applied, thereby cancelling the feedback in light emitting diode 134. The hybrid is perfectly balanced for only one value of load impedance, but this does not present a problem for other loads as will be explained hereinbelow.

Thus, the coupling between current amplifiers 131 and 133 causes the feedback cancellation signal to be equal in magnitude but opposite in sign to the linearizing feedback signal, thereby cancelling signal feedback in light emitting diode 134 without requiring the use of summing amplifiers, complex feedback impedances, or impedance matching circuits.

DETAILED DESCRIPTION —FIG. 2

Figure 2:
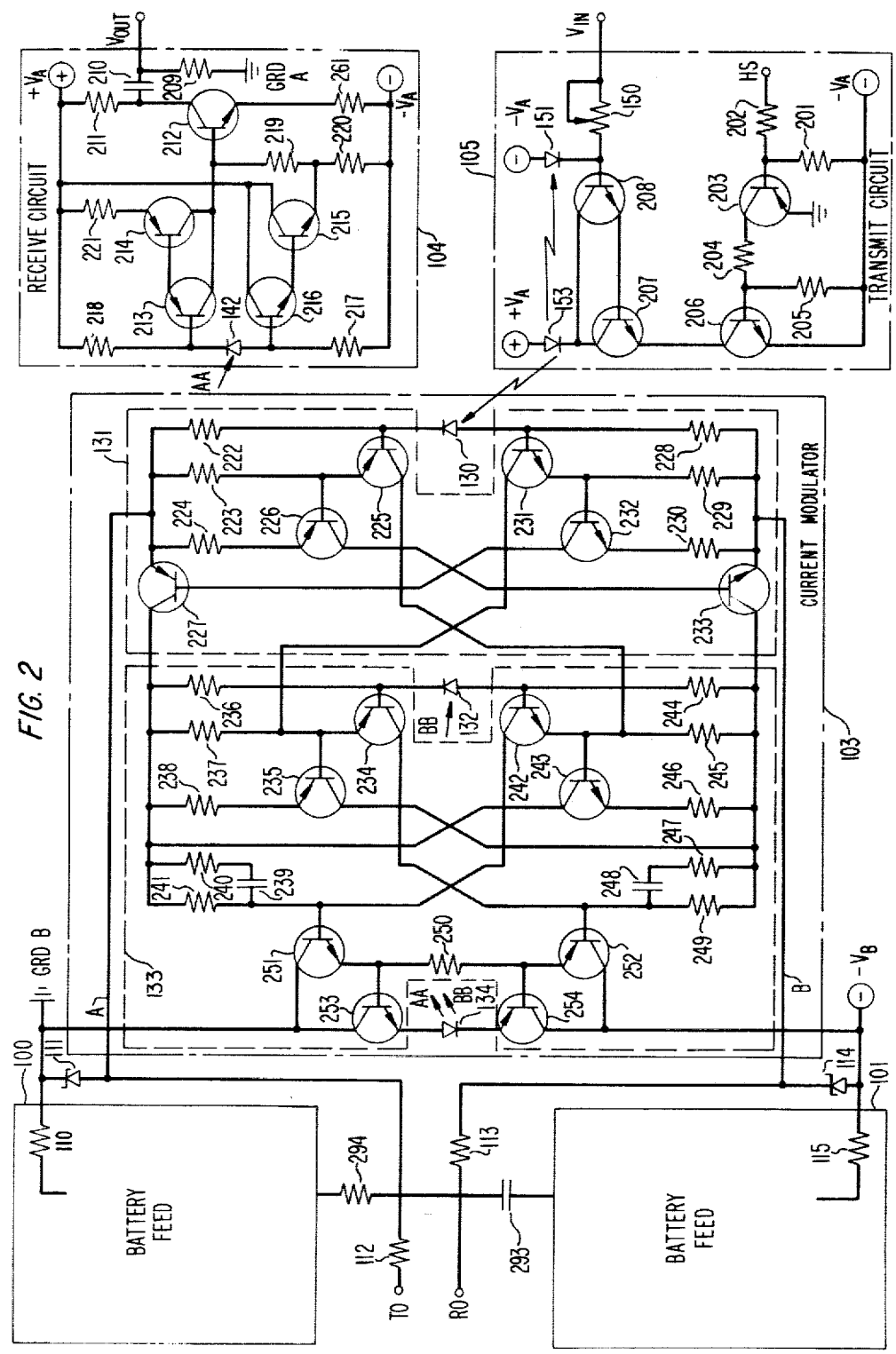
FIG. 2 depicts the details of the disclosed opto-isolator hybrid circuit.

FIG. 2 illustrates the details of the preferred embodiment of the discussed opto-isolator hybrid circuit. The circuitry disclosed in FIG. 2 is oriented in a manner analogous to that of FIG. 1 to thereby enable the reader to better comprehend the hybrid circuit of our invention. As mentioned above, it is assumed that the hybrid circuit of FIGS. 1 and 2 is connected on the two-wire side to a communication pair and telephone station set ST0 (not shown), via hybrid circuit terminals T0 and R0. The four-wire side of the hybrid circuit is connected through hybrid circuit terminals $V_{OUT}$ and $V_{IN}$ to a four-wire transmission system (not shown). Return paths for the signals appearing at terminals $V_{IN}$ and $V_{OUT}$ are provided by circuit ground $GRD_A$.

BATTERY FEED CIRCUITS 100, 101

Battery feed circuits 100, 101 as mentioned above, must feed battery current and provide protection against lightning and other hazardous voltages for the associated telephone station set ST0. Each of battery feed circuits 100, 101 acts as a constant current source for transverse signals and as a short circuit for longitudinal signals. Such battery feed circuits are well known in the art and one such circuit is disclosed in U.S. Pat. No. 4,087,647 issued May 2, 1978 to M. L. Embree, et al.

ZERO STAND-BY POWER DISSIPATION

The disclosed opto-isolator hybrid circuit is configured to use only minimal power while in the stand-by state. This is accomplished by employing a standard hook status detector (not shown), which provides a binary signal to terminal HS of transmit circuit 105, indicating the on-hook/ off-hook status of associated telephone station set ST0. The signal appearing on terminal HS can be used to control a switch that disconnects the emitter of transistor 207 from the negative supply voltage $-V_A$ when the telephone station set is on-hook. Transistor 206 acts as this switch between the emitter of transistor 207 and the negative supply voltage $-V_A$. Transistor 203 and resistors 201, 202, 204 and 205 provide the necessary level shifting to interface the signal level appearing on terminal HS with the signal required at the base of transistor 206 to activate the transistor. When terminal HS has a low signal appearing thereon, transistors 203 and 206 are turned on and the emitter of transistor 207 is connected to the negative power supply voltage $-V_A$. Placing terminal HS in the high state reverses the bias on transistor 203 which turns off the entire input circuit comprised of transistor 207, 208 and light emitting diode 153. This switching has a ripple effect in that when light emitting diode 153 is turned off, there is no bias current in light detecting diode 130 and, therefore, no current flows through current modulator 131. When this happens, the collector currents of transistors 226 and 232 of current modulator 131 are zero. This causes switching transistors 227 and 233 to turn off, thereby preventing any current from flowing through current modulator 133. With current modulator 133 off, there is no base current to drive transistors 251 through 254, so there is no bias current in light emitting diode 134. This turns light detecting diode 142 off which thereby turns off transistors 212 through 216. With no current flowing through the current modulator, no current can then flow through battery feed circuits 100 and 101 and the standby current of the entire opto-isolator hybrid drops to a very low value.

CURRENT MODULATORS 131, 133

The current modulators have several different functions which may all be active at the same time. For the sake of clarity, they will be discussed separately. The discussions to follow will also be simplified by assuming infinite gain for all transistors and complete symmetry about a horizontal line drawn through the center of current modulators 131 and 133.

FOUR-WIRE TO TWO-WIRE TRANSMISSION WITH BALANCED HYBRID

In this subsection we consider the operation of current modulators 131, 133 with a driving signal being applied to terminal $V_{IN}$ of transmit circuit 105, which signal is propagated through current modulator 131 to the two-wire terminals T0 and R0. It is assumed for the moment that the only voltage appearing at terminals T0 and R0 is the output signal from the opto-isolator hybrid with no input from the telephone transmitter being applied. Since the hybrid is balanced, there will be no signal current through light emitting diode 134 and hence there is no feedback current through light detecting diode 132 or light detecting diode 142.

The driving signal applied to terminal $V_{IN}$ drives transistors 207 and 208 which amplify the signal and apply it to the cathode terminal of light emitting diode 153. This excitation of light eitting diode 153 causes a light signal to be generated, which signal, as mentioned above, is applied to light detecting diode 151, which diode linearizes the characteristics of light emitting diode 153 as taught by the above-mentioned Waaben patent. Additionally, the light output from light emitting diode 153 is applied to light detecting diode 130. The light signal applied to light detecting diode 130 modulates the current flowing through this diode, which current also flows through resistors 222 and 228. For simplicity, we will concentrate on the upper half of the symmetrical circuits of current modulators 131 and 133. In doing this, we see that the current through resistor 223 is equal to the current through resistor 222 multiplied by the ratio of resistors 222 to 223. The current through resistor 223 contributes some to the gain of current modulator 131 although this is not its main function which will be disclosed later in this text. Meanwhile, it can be seen that through transistor 226, the signal is transferred to resistor 224 and the current through resistor 224 is equal to the current in resistor 222 multiplied by the ratio of resistors 222 to resistor 224. By maintaining this ratio high, there will be a large current gain. The current flowing through resistor 224 passes through the collector of transistor 226 to the bottom node (node B) of current modulator 131. The collector current of transistor 226 passes through the base-emitter junction of transistor 223 and causes transistor 233 to saturate. The bottom half section of current modulator 131 operates in analagous fashion, supplying a current in the same direction through transistor 232 and resistor 230. Under the assumptions of this subsection, there is no other signal current through current modulators 131 and 133, and since battery feed circuits 100 and 101 are assumed to be infinite impedances for transverse signals, all the modulator current flows through resistors 112 and 113 to the load impedance which is telephone station set ST0 connected to terminals T0 and R0. The voltage appearing at terminals T0 and R0 is the product of the modulator current and the load impedance, with this voltage being 180 degrees out of phase with that appearing at terminal $V_{IN}$.

FEEDBACK CANCELLATION

The signal voltage $V_M$ which is developed between nodes A & B of current modulators 131, 133 causes a signal current to flow through the series-parallel combination of resistors 240, 241 and capacitor 239. If this signal current is allowed to drive the base of transistor 251, the current through light emitting diode 134 will be modulated, which would violate the assumption that the hybrid is balanced. This can be prevented, if the AC collector current of transistor 242 is equal to the signal current through resistors 240, 241 since there will be no base current to drive transistors 251, 253 and therefore, light emitting diode 134 will have no signal current. To satisfy these conditions, we note that the current through resistor 223 is equal to the collector current of transistor 225 since we assumed the gain from transistor 225 is essentially infinite. With no signal current in light emitting diode 134, there would be no signal current in light detecting diode 132 and thus, through resistor 244. Hence, there would be no signal voltage across resistor 244 and there can also be no signal voltage across resistor 245. The only current flowing through resistor 245 would be the sum of the collector current of transistor 225 and the emitter current of transistor 242. Since the collector current and the emitter current of transistor 242 are equal, the collector current of transistor 242 would be equal to the current through resistor 223 with a 180 degree phase shift. This current can be adjusted to be equal in magnitude to the signal current through resistors 240 and 241 by adjusting the ratio of resistors 222 and 223. Thus, this adjustment can be used to balance the hybrid for a given value of load impedance thereby eliminating the signal current through light emitting diode 134 thereby satisfying our original assumption. It is worth noting that with the hybrid balanced, all of the signal currents developed in current modulator 131 pass through the load impedance. Even the small signal current flowing through resistors 240 and 241 effectively completes the path for the current through resistor 223.

FOUR-WIRE TO TWO-WIRE TRANSMISSION WITH UNBALANCED HYBRID

Let us assume that resistor 223 was adjusted to balance the hybrid for a 600 ohm resistive load. Thus, if any other load is connected across terminals T0 and R0, the hybrid would not be balanced. The total modulation current through resistors 222 through 224 and through the collector of transistor 232 will not change since it is not a function of the load impedance. Hence, the magnitude of the voltage appearing at terminals T0 and R0 as well as voltage $V_M$ will both increase. Similarily, the magnitude of the current through resistors 240 and 241 will increase if the load is higher, but the collector current of transistor 242 does not increase. Thus, the two currents do not cancel and the difference drives the base of transistor 251 which causes a modulator current to flow through light emitting diode 134.

The modulator current flowing through light emitting diode 134 causes a light output to be generated, which output is coupled to a light detecting diode 132 where it is converted to a modulating current. The modulating current of light detecting diode 132 is amplified in two paths by the resistance ratios of resistor 236 to 237 and resistor 237 and 238. There are now currents from two sources flowing through resistor 237, the first being the collector current of transistor 231 and the second being the modulating current of light detecting diode 132 amplified by the ratio of resistor 236 through 237. The phase relationships of these currents are such that the collector current of transistor 234 is reinforced and the feedback through light detecting diode 132 tends to reduce the unbalanced current flowing in light emitting diode 134 and to partially restore the balance of the hybrid.

There is a second, more subtle, feedback loop which tends to stabilize the gain of the hybrid. This feedback loop entails the current gain from light detecting diode 132 to the collector of transistors 235 and 243, which transistors act in parallel. This current gain is twice the ratio of resistors 236 to 238 and the phase relationships are such that current modulator 133 is out of phase with current modulator 131. Hence, part of the current that would normally pass through the load impedance if the hybrid were balanced is now shunted through current modulator 133. The reduced current flow through the higher load impedance therefore tends to result in the same gain as in the case of the balanced hybrid.

A load impedance which is lower than the value required to balance the hybrid produces less current to the collector of transistor 242 which tends to keep the current through resistors 240 and 241 in balance. However, in order to maintain a constant output voltage, the overall modulator current needs to be increased. This is accomplished by the collector currents of transistors 235 and 243 which are now in phase with the collector current of transistors 226 and 232 to provide the needed boost in the modulator current.

TWO-WIRE TO FOUR-WIRE TRANSMISSION

Assume, for this subsection, that there is no input applied to terminal $V_{IN}$ and that the only signal applied to the opto-isolator hybrid appears at terminals T0 and R0. This driving signal applied across terminals T0 and R0 is applied through resistos 112 and 113 to nodes A & B of current modulator 133. This driving voltage drives transistors 251 through 254 and there is no cancellation of the base current through these transistors by a collector current from transistor 235 or 243 due to the fact that there is no signal current in light detecting diode 130 because we have assumed that the voltage appearing at terminal $V_{IN}$ is zero. With transistors 251 through 254 being active, a large signal current flows through light emitting diode 134 which causes a light output to be generated, which output is applied to light detecting diodes 132 and 142. This light signal applied to light detecting diode 132 causes the current flowing therein to be modulated and this modulated current is amplified by transistors 234 and 242. The collector currents of these two transistors partially cancel the base drive signals of transistors 251 through 254 thereby linearizing the output characteristics of light emitting diode 143. The modulated current flowing through light detecting diode 142 is applied to the base terminals of transistors 213 and 216. Resistors 217 and 218 are selected to be equal in value as are resistors 220 and 221. Thus, the emitter current of transistors 215 is equal to the sum of the collector currents of transistors 213 and 214. The voltage appearing at the base terminal of transistor 212 is then equal to the sum of the voltage drops produced by passing the collector currents of transistors 213 and 214 through both resistors 219 and 220 and the emitter current of transistor 215 through resistor 220. If resistor 219 is selected to be double the resistance of resistor 220, then the voltages appearing across each resistor will be identical. The sum of these voltages is applied to the base terminal of transistor 112 which then drives the output terminal $V_{OUT}$. The overall gain of buffer transistor 212 is determined by the ratio of the resistances of resistor 211 to resistor 261. Thus, the value of either one of these resistors could be trimmed to adjust the total (GAIN2) of the two-wire to four-wire transmission path from terminals T0 and R0 to terminal $V_{OUT}$.

We have not yet discussed the role of transistors 235 and 243. These two transistors serve to reduce the impedance connected to terminals T0 and R0 on the two-wire side. Since current modulator 131 appears as an open circuit when no signal voltage is applied to terminal $V_{IN}$, the total signal current flowing through resistors 236, 237, 240, and 241 is quite small. If resistors 112 and 113 have low values, proper impedance matching can be accomplished only by including transistors 235 and 243 and current modulator 133. This is accomplished by amplifying the signal coupled from light emitting diode 134 to light detector 132. This amplified signal draws signal current through nodes A and B and acts as a load for terminals T0 and R0.

Thus, the current modulator/opto-isolator combination provides the necessary feedback signal cancellation to prevent signals from being coupled through the two-wire port to the receive portion of the four-wire port. This opto-isolator feedback cancellation arrangement eliminates the need for complex feedback and impedance matching circuits, thereby enabling direct connection of the telephone station set to the hybrid.

In the above-described preferred embodiment of our invention, the technique of summing currents that are 180 degrees out-of-phase is employed to eliminate the undesirable two-wire to four-wire feedback. However, it is also possible to employ the analagous technique of summing voltages that are in-phase to eliminate the undesirable feedback. In particular, the two-wire to four-wire transmission circuit employs light emitting diode 134 as an isolation/transmission element and thus, the undesirable two-wire to four-wire feedback signal voltage will appear on one terminal of light emitting diode 134. This signal can be eliminated by simply applying the same undesirable feedback signal voltage to the other terminal of light emitting diode 134 which prevents light emitting diode 134 from generating light emissions representative of the unwanted feedback signal, thereby eliminating the undesirable feedback. The exact circuitry to accomplish this is not shown in the drawing since one skilled in the art could easily modify the preferred embodiment disclosed herein to employ this alternative technique.

Thus, it can be seen that while a specific embodiment of our invention has been disclosed, variations in the structural detail, within the scope of the appended claims, are possible and are contemplated. There is no intention of limitation to what is contained in the abstract or in the exact disclosure as herein presented since the above-described apparatus is only illustrative of the application of the principles of our invention. Normally, other arrangements may be devised by those skilled in the art without departing from either the spirit or the scope of our invention.

We claim:

1. A bidirectional coupler circuit having a first set (T0, R0) and a second set ($V_{IN}$, $V_{OUT}$) of terminals for providing unidirectional signal transmission from said first set (T0, R0) of terminals to said second set ($V_{IN}$, $V_{OUT}$) of terminals and from said second set ($V_{IN}$, $V_{OUT}$) of terminals to said first set (T0, R0) of terminals comprising:
   first light emitting means (134, 239–41, 248–54) connected to said first set of terminals (T0, R0) and responsive to a first set of electrical signals appearing thereon for generating light emissions representative of said first set of electrical signals;
   first light detecting means (104) optically coupled to said first light emitting means (134, 230–41, 248–54), connected to a first one of said second set of terminals ($V_{OUT}$) and responsive to said light emissions for converting said light emissions to electrical signals representative of said first set of electrical signals and for applying said electrical signals representative of said first set of electrical signals to said first one of said second set of terminals ($V_{OUT}$);
   reverse transmission means (130, 131, 105) connected to both said first set (T0, R0) and a second one of said second set ($V_{IN}$) of terminals and responsive to a second set of electrical signals appearing on said second one of said second set of terminals ($V_{IN}$) for applying said second set of electrical signals to said first set of terminals (T0, R0);
   wherein said first light emitting means (134, 239–41, 248–54) are also responsive to said second set of electrical signals appearing on said first set (T0, R0) of terminals for generating light emissions representative of said second set of electrical signals; and
   feedback means (234, 242) connected both to said first light emitting means (134, 239–41, 238–54) and to said reverse transmission means (130, 131, 105), and responsive to said reverse transmission means (130, 131, 105) applying said second set of electrical signals to said first light emitting means (134, 239–41, 248–54) for preventing said first light emitting means (134, 239–41, 248–54) from generating light emissions representative of said second set of electrical signals.

2. The invention of claim 1 wherein said first light emitting means (134, 239–41, 248–54) includes first light emitting diode means (134, 250''54) and;
   wherein said reverse transmission means (130, 131, 105) applies said second set of electrical signals to said first light emitting diode means 134, 250–54) and said feedback means (234, 242) applies said second set of electrical signals 180 degrees out-of-phase to said first light emitting diode means (134, 250–54) to prevent said first light emitting diode means (134, 250–54) from transmitting said second set of electrical signals to said first one of said second ($V_{OUT}$) set of terminals.

3. The invention of claim 1 wherein said reverse transmission means (130, 131, 105) includes:
   inversion means (225, 231) for converting said second set of electrical signals to a 180 degrees out-of phase replica of said second set of electrical signals; and
   wherein said feedback means (234, 242) are responsive to said inversion means (225, 231) for applying said 180 degrees out-of-phase replica of said second set of electrical signals to said first light emitting diode means (134, 250–54) to cancel said second set of electrical signals applied to said first light emitting diode means (134, 250–54) by said reverse transmission means (130, 131, 105).

4. A bidirectional coupler circuit having a first set (T0, R0) and a second set ($V_{IN}$, $V_{OUT}$) of terminals for providing unidirectional signal transmission from said first set (T0, R0) of terminals to said second set ($V_{IN}$, $V_{OUT}$) of terminals and from said second set ($V_{IN}$, $V_{OUT}$) of terminals to said first set (T0, R0) of terminals comprising:
   first light emitting means (134, 239–41, 248–54) connected to said first set of terminals (T0, R0) and responsive to a first set of electrical signals appearing thereon for generating light emissions representative of said first set of electrical signals;
   first light detecting means (104) optically coupled to said first light emitting means (134, 239–41, 248–54), connected to a first one of said second set of terminals ($V_{OUT}$) and responsive to said light emissions for converting said light emissions to electrical signals representative of said first set of electrical signal and for applying said electrical signals representative of said first set of electrical signals to said first one of said second set of terminals ($V_{OUT}$);
   reverse transmission means (130, 131, 105) connected to both said first set (T0, R0) and a second one of said second set ($V_{IN}$) of terminals and responsive to a second set of electrical signals appearing on said second one of said second set of terminals ($V_{IN}$) for applying said second set of electrical signals to said first set of terminals (T0, R0);
   wherein said first light emitting means (134, 239–41, 248–54) are also responsive to said second set of electrical signals appearing on said first set (T0, R0) of terminals for generating light emissions representative of said second set of electrical signals; and
   feedback means (234, 242) connected both to said first light emitting means (134, 239–41, 248–54) and to said reverse transmission means (130, 131, 105), and responsive to said reverse transmission means (130, 131, 105) applying said second set of electrical signals to said first light emitting means (134, 239–41, 248–54) for applying to said first light emitting means (134, 239–41, 248–54) a 180 degrees out-of-phase replica of said second set of electrical signals to prevent first light emitting means (134, 239–41, 248–54) from generating light emissions representative of said second set of electrical signals.

5. The invention of claim 4 wherein said reverse transmission means (130, 131, 105) includes:
   inversion means (225, 231) for converting said second set of electrical signals to a 180 degrees out-of-phase replica of said second set of electrical signals; and
   wherein said feedback means (234, 242) are responsive to said inversion means (225, 231) for applying said 180 degrees out-of-phase replica to said first light emitting means (134, 239–41, 248–54) to cancel said second set of electrical signals applied to said first light emitting means (134, 239–41, 248–54) by said reverse transmission means (130, 131, 105).

6. The invention of claim 5 wherein said reverse transmission means (130, 131, 105) comprises:
   second light emitting means (105) connected to said second one of said second set ($V_{IN}$) of terminals and responsive to said second set of electrical signals appearing thereon for generating light emissions representative of said second set of electrical signals;
   second light detecting means (130) optically coupled to said second light emitting means (105), and responsive to light emissions generated by said second light emitting means (105) for converting said last mentioned light emissions to electrical signals representative of said second set of electrical signals; and
   current modulator means (131) responsive to said second light detecting means (130) for applying said electrical signals representative of said second set of electrical signals to said first set (T0, R0) of terminals.

7. The invention of claim 6 wherein said current modulator (131) comprises a current amplifier for driving said first set (T0, R0) of terminals with said electrical signals representative of said second set of electrical signals.

8. The invention of claim 4 wherein said first light detecting means (104) includes a current amplifier (209–221, 261) for driving said first one of said second set ($V_{OUT}$) of terminals with said electrical signals representative of said first set of electrical signals.

9. The invention of claim 4 wherein said first (134, 239–41, 248–54) and said second (105) light emitting means includes first (134) and second (153) light emitting diode means for respectively converting said first set and said second set of electrical signals to light emissions representative of said respective first set and second set of electrical signals.

10. The invention of claim 4 wherein said first (104), and said second (130) light detecting means includes first (142) and second (130) light detecting diode means for respectively converting said light emissions representing said first set and said second set of electrical signals to electrical signals representing said first set and said second set of electrical signals.

11. The invention of claim 9 wherein said first light emitting means (134, 239–41, 248–54) includes isolation amplifier means (239″, 248–254) is connected to said first set (T0, R0) of terminals for providing unidirectional electrical signal transmission from said first set (T0, R0) of terminals to said first light emitting diode means (134).

12. A four-wire to two-wire coupler circuit having first (T0, R0), second ($V_{OUT}$), and third ($V_{IN}$) terminals comprising:
   first light emitting diode means (134, 239–41, 248–54) electrically connected to said first terminal (T0, R0) for converting a first set of electrical signals appearing thereon to a first set of light emissions representative of said first set of electrical signals;
   first (142) light detecting diode means optically coupled to said first light emitting diode means (134, 239–41, 248–54) electrically connected to said second terminal ($V_{OUT}$) and responsive to said first set of light emissions for converting said first set of light emissions to electrical signals representative of said first set of light emissions and for applying said electrical signals to said second terminal ($V_{OUT}$);
   second light emitting diode means (153) electrically connected to said third terminal ($V_{IN}$) for converting a second set of electrical signals appearing thereon to a second set of light emissions representative of said second set of electrical signals;
   second light detecting diode means (130) optically coupled to said second light emittiong diode means (153), electrically connected to said first terminal (T0, R0) and responsive to said second set of light emissions for converting said second set of light emissions to electrical signals representative of said second set of light emissions and for applying said electrical signals to said first terminal (T0, R0); and
   wherein said second light detecting diode means (130) are also electrically connected to both said first light emitting diode means (134, 239–41, 248–54) and feedback means (234, 242) which are responsive to said second light dectecting diode means 130 for driving said first light emitting diode means (134, 239–41, 248–54) with a signal equal in magnitude but opposite in phase to the signal applied to said first light emitting diode means (134, 239–41, 248–54) by said second light detecting diode means (130) to cancel any feedback from said third terminal ($V_{IN}$) to said second terminal ($V_{OUT}$) via said first terminal (T0, R0).

13. The invention of claim 12 wherein said first light emitting diode means (134, 239–41, 248–54) is connected to said first terminal (T0, R0) by an isolation amplifier (250–254) for providing unidirectional signal transmission from said first terminal (T0, R0) to said first light emitting diode means (134, 239–41, 248–54).

* * * * *